United States Patent Office 3,234,165
Patented Feb. 8, 1966

3,234,165
POLYVINYL CHLORIDE, AND EPOXIDE CROSS-
LINKED WITH AMINE-KETONE CONDENSA-
TION PRODUCT
Barrie James Hayes, Dorking, England, assignor to Ciba
Limited, Basel, Switzerland, a company of Switzerland
No Drawing. Filed Dec. 17, 1962, Ser. No. 244,875
Claims priority, application Great Britain, Dec. 19, 1961,
45,524/61
6 Claims. (Cl. 260—29.6)

This invention relates to compositions useful as adhesives and for surface coating, and more particularly to such compositions containing at least one halogen containing vinyl polymer and at least one epoxide resin, together with a curing agent capable of reacting with both epoxide resins and halogen containing vinyl polymers.

It is well known that objects can be coated by the application thereto of a resin dispersed in a suitable plasticiser therefor, the applied coating being heated to an appropriate gelling temperature. Such a method may be employed with a wide range of polyvinyl resins, in particular polyvinyl chloride and copolymers of vinyl chloride and other unsaturated monomers. Tough, abrasion-resistant coatings are easily formed in this way but they suffer from the disadvantage of having very poor adhesion to most surfaces.

It has been suggested that the adhesion of these coatings can be improved greatly by the inclusion in the coating compositions of epoxide resins and curing agents which react with both the epoxide resin and the vinyl polymers. Curing agents which do not react with the vinyl resin but only with the epoxide materials do not give rise to good adhesion. The quantity of epoxide resin added may be from 5% to 250% of the vinyl resin, but is usually from 5% to 50% of the vinyl resin. While it is true that this method does in fact greatly improve the adhesion of vinyl coatings to various surfaces it has hitherto suffered from the disadvantage that bubbles tend to form in the cured film. This bubbling effect is particularly evident when the curable mixtures have been stored at room temperature before use and the prior art compositions have thus the further disadvantage of a short shelf-life.

The main class of materials which have been used to cross-link mixtures of epoxide resins and polyvinyl halides and/or copolymers of vinyl halides with other vinyl monomers are aliphatic polyamines as described in British specification No. 777,052. Bubble formation is apparently caused by the reaction between the crosslinking or curing agent and the halogen-containing vinyl polymer, which leads to the elimination of free hydrogen chloride which, on gelation of the composition is trapped in the coating. This effect is not critically important in very thin coatings since most of the hydrogen chloride boils off before gelation occurs, but for films thicker than 0.05 mm. evidence of bubble formation is apparent. This is particularly disadvantageous because essentially "solvent-free" coatings are normally applied in thick films to avoid the expense of recoating. There is thus a need for compositions which have a reduced tendency to form bubbles but retain good adhesive properties.

According to the present invention there are provided compositions suitable as coating and adhesive compositions which comprise a halogen containing vinyl polymer, a plasticiser therefor in which the said polymer is insoluble at room temperature, an epoxide resin having an epoxide equivalency greater than one, and as curing agent, a condensation product containing no primary amino groups and made by condensing an amine containing two or more primary amino groups with a volatile ketone, the said composition also comprising sufficient moisture to be curable by heat. It is found that such compositions show excellent adhesion to a wide variety of surfaces and have a very much reduced tendency to form bubbles on curing even when utilised in the production of relatively thick surface coatings.

Since the curing agents employed in the compositions of this invention do not contain primary amine groups in the molecule they do not react rapidly with polyvinyl halides at room temperature and hence do not bring about premature formation of hydrogen chloride. Condensation products of this type which contain no amine hydrogen at all, e.g. as produced from ethylene diamine and a ketone, hardly react in the absence of moisture. However, under the influence of heat and moisture the free amine is liberated and a rapid and efficient cure is effected without concomitant formation of bubbles. If desired a compound possessing chemically combined water which is liberated at or below the curing temperature, e.g. hydrated calcium sulphate, may be incorporated. This will then cause more efficient hydrolysis of the condensed amine/ketone to yield the free amine. Under the curing conditions the free ketone rapidly evaporates. The addition of a water-liberating compound is normally unnecessary since the vinyl polymer usually contains small quantities of moisture remaining from its manufacturing process and this is utilized in the hydrolysis when heat is applied. However, if anhydrous components are used in formulating the composition, the amount of moisture needed to make the composition curable by heat is readily found by routine equipment.

The new compositions, when protected from excess moisture, usually have a storage life of several weeks at room temperature, a further advantage over the compositions of the prior art.

The curing agents are formed by a condensation reaction, with elimination of water, between the amine and the ketone, e.g. the amine may be heated with excess ketone, if necessary in an inert atmosphere such as nitrogen, and water and excess ketone removed by distillation. When the ketone employed boils at a higher temperature than water, and is not completely removed by azeotropic distillation with the water, it is preferable to remove the residual ketone, after removal of water is complete, by distillation in a vacuum.

Amines suitable for use in the preparation of the curing agents used in the new compositions include the polyamines represented by the formula $H_2N(C_2H_4NH)_nH$ where $n$ is an integer from 1 to 4, i.e. ethylene diamine, diethylene triamine, triethylene tetramine, and tetraethylene pentamine. Other amines which can be used include dipropylene triamine, tripropylene tetramine, and tri-, tetra-, penta- and hexamethylene diamine. Cycloaliphatic diamines, such as bis-(4-amino-3-methylcyclohexyl) methane and 3-(3-aminocyclohexyl)-n-propylamine, and aromatic diamines, such as bis-(4-aminophenyl) methane, bis(4-aminophenyl) sulphone, and m-phenylenediamine, can also be used.

Examples of the aliphatic and cycloaliphatic ketones that may be used are acetone, methyl ethyl ketone, methyl isopropyl ketone, di-isopropyl ketone, methyl isobutyl ketone, di-isobutyl ketone and methyl cyclohexanone.

Vinyl polymers which may be employed in the compositions of this invention include polyvinyl chloride, and copolymers of vinyl chloride with other unsaturated monomers such as vinyl acetate, maleic anhydride, ethylene, acrylonitrile, vinylidene chloride and acrylic esters. Others which may be used are polymers that have been subjected to processes such as chlorination and hydrolysis, for example chlorinated polyvinyl chloride and partially hydrolysed polyvinyl acetates and acetals. The plasticiser for the polyvinyl resin may be of any of the usual types, e.g. phthalates, sebacates, phosphates and epoxidised unsaturated acids and alcohols and esters derived therefrom.

Epoxide resins which may be used in the compositions of this invention include, for example, mono- and polyglycidyl ethers of mono- and poly-alcohols such as butyl alcohol, butane-1,4-diol, glycerol or N-aryl ethanolamines such as N-phenyldiethanolamine, or of mono- and polyphenols such as resorcinol, 2,2-bis-(4-hydroxy phenyl) propane and condensation products of aldehydes with phenols (novolaks), polyglycidyl esters of polycarboxylic acids such as phthalic acid, aminopolyepoxides such as are for example obtained by the dehydrohalogenation of the reaction products of epihalohydrins and primary or secondary amines such as n-butylamine, aniline or 4,4'-di(monomethylamino)-diphenylmethane, and the products that are obtained by complete or incomplete epoxidation of ethylenically-unsaturated cyclic or acylic olefines or polyolefines.

In addition to the components referred to above, the compositions of the present invention may contain mineral and vegetable fillers, reinforcements, pigments and dyes.

The new compositions may be used to coat ferrous metals such as mild steel, non-ferrous metals such as aluminium, glass, wood, and ceramics and also textiles made from polyamides or polyesters. They may also be used on adhesives for securing adhesion between two such surfaces. Processes of coating, or securing adhesion between, such surfaces using the new compositions are within the cope of the invention.

The following examples in which the parts referred to are by weight, illustrate the invention.

*Example I*

A curing agent was prepared by refluxing a mixture of diethylene triamine (100 parts) and methyl isobutyl ketone (250 parts) using a water trap of the Dean and Stark type to collect the water produced. When 35 parts of water had been removed, infra-red examination of the reaction mixture indicated that no primary amine groups remained and excess methyl isobutyl ketone was then distilled off under vacuum at a temperature of 120° C. The reaction product (252 parts) had a viscosity of 12 centipoises at 25° C. and a nitrogen content of 15.5%.

A liquid epoxide resin (Resin A) having an epoxide content of 5.10 equivalents per kilogram was prepared in the conventional manner by reacting epichlorohydrin and 2,2-bis-(4-hydroxyphenyl)-propane under alkaline conditions.

A coating composition was formulated as follows:

| | Parts |
|---|---|
| Polyvinyl chloride paste | 80 |
| Curing agent | 6 |
| Resin A | 20 |

This was applied to shot-blasted mild steel panels and cured for 5 minutes at 180° C. The coating, which had an average thickness of 0.25 mm., showed excellent adhesion and flexibility and had no bubbles even in thick sections. When the curing agent in the above formulation was replaced by diethylene triamine (2.4 parts) and a coating of equal thickness similarly applied, it showed after curing excellent adhesion and flexibility but was marred by extensive bubbles which rendered it useless for most applications.

The polyvinyl chloride paste used in the above formulation is marketed by Imperial Chemical Industries Ltd., under the trade name "Welvic Paste" and has the following composition:

| | Parts |
|---|---|
| Vinyl chloride polymer P65/54 | 50 |
| Vinyl chloride polymer D55/3 | 50 |
| "Pliabrac" 980 (adipate plasticiser) | 25 |
| "Lubrol" MOA (polyethylene oxide viscosity depressant) | 2 |
| "Abrac" A (epoxidised soya bean oil) | 2 |
| "Stanclere" 80 (organotin stabiliser) | ¾ |

"Pliabrac," "Lubrol," "Abrac" and "Stanclere" are trade names.

*Example II*

The epoxide resin A, used in the formulation given in Example I, was replaced by 20 parts of an epoxide resin having an epoxide content of 5.2 equivalents per kilogram prepared as described below. A coating of thickness 0.25 mm. applied as in Example I again showed no evidence of bubble formation.

The epoxide resin was made by the interaction of N-phenyldiethanolamine and epichlorohydrin as follows-N-phenyldiethanolamine (122 g., 0.66 mol) and epichlorohydrin (370 g., 4 mol) were charged into a flask fitted with stirrer, water entrainer, and reflux condenser. The mixture was heated to effect solution of the amine. When the solution had reached 80–90° C., a solution of 5 g. of sodium hydroxide in 5 ml. of water and 2.5 ml. of methoxyethanol was added with stirring. An exothermic reaction set in and the mixture began to boil. After the initial reaction had abated, a further 5 g. of sodium hydroxide, in flake form, was added. The additions of alkali were continued over a period of 3½ hours until a total of 72 g. of sodium hydroxide had been added to the flask. The reaction mixture was held at the boiling point by the exothermic reaction and by application of heat for a further ¾ hour after the additions of alkali had been completed. During this reaction period water in the distillate was collected in the entrainer and epichlorohydrin in the distillate returned to the flask.

The reaction mixture was allowed to cool slightly, and then filtered and the filtrate evaporated taken up in trichloroethylene, washed with water, and the product recovered by evaporation of the solvent.

*Example III*

A curing agent was prepared by refluxing under nitrogen a mixture of ethylene diamine (65.3 parts) and methyl isobutyl ketone (300 parts) using a water trap of the Dean and Stark type to collect the water produced. When 41.3 parts of water had been removed, infra-red examination of the reaction mixture indicated that no primary amine groups remained and excess ketone was then distilled off under vacuum at a temperature of 120° C.

The reaction product (224 parts) had a nitrogen content of 12%.

Using this curing agent an adhesive mastic was prepared according to the following formulation:

| | Parts |
|---|---|
| Curing agent | 7 |
| Welvic paste | 60 |
| Vinyl chloride/vinyl acetate/maleic anhydride terpolymer supplied by Bakelite Ltd. and designated VMCH | 10 |
| Resin A | 20 |
| Silica flour | 60 |
| Aerosil (registered trade mark) (a finely divided form of silica) | 5 |

The mastic was cured for 20 minutes at 150° C. between glass and aluminium adherends. It flowed very little during cure and when cured showed good flexibility, excellent adhesion and no evidence of bubble formation.

What is claimed is:

1. A heat-hardenable composition of matter, which comprises
    (1) a chlorovinyl polymer selected from the group consisting of homopolymers of vinyl chloride and copolymers of vinyl chloride with at least one other copolymerizable ethylenically unsaturated monomer;
    (2) a plasticizer for said chlorovinyl polymer in which the said polymer is insoluble at room temperature;
    (3) a 1,2-epoxide compound having a 1,2-epoxy equivalency greater than 1;
    (4) as cross-linking agent the condensation product of a polyamine containing at least two primary amino groups with a ketone, which is volatile at the curing temperature of the heat-hardenable composition, said condensation product being free from primary amino groups;
    (5) a minor amount of water, said amount being sufficient to promote the liberation of the free amine from the condensation product of the polyamine with the ketone at the curing temperature of the heat-hardenable composition.

2. A heat-hardenable composition of matter, which comprises
    (1) a chlorovinyl polymer selected from the group consisting of homopolymers of vinyl chloride and copolymers of vinyl chloride with at least one other copolymerizable ethylenically unsaturated monomer;
    (2) a plasticizer for said chlorovinyl polymer in which the said polymer is insoluble at room temperature;
    (3) a 1,2-epoxide compound having a 1,2-epoxy equivalency greater than 1; said 1,2-epoxy compound being present in an amount of 5% to 250% by weight calculated on the weight of the chlorovinyl polymer;
    (4) as cross-linking agent the condensation product of a polyamine containing at least two primary amino groups with a ketone, which is volatile at the curing temperature of the heat-hardenable composition, said condensation product being free from primary amino groups;
    (5) a minor amount of water, said amount being sufficient to promote the liberation of the free amine from the condensation product of the polyamine with the ketone at the curing temperature of the heat-hardenable composition.

3. A heat-hardenable composition of matter, which comprises
    (1) a chlorovinyl polymer selected from the group consisting of homopolymers of vinyl chloride and copolymers of vinyl chloride with at least one other copolymerizable ethylenically unsaturated monomer;
    (2) a plasticizer for said chlorovinyl polymer in which the said polymer is insoluble at room temperature;
    (3) a 1,2-epoxide compound having a 1,2-epoxy equivalency greater than 1; said 1,2-epoxy compound being present in an amount of 5% to 50% by weight calculated on the weight of the chlorovinyl polymer;
    (4) as cross-linking agent the condensation product of a polyamine containing at least two primary amino groups with a ketone, which is volatile at the curing temperature of the heat-hardenable composition, said condensation product being free from primary amino groups;
    (5) a minor amount of water, said amount being sufficient to promote the liberation of the free amine from the condensation product of the polyamine with the ketone at the curing temperature of the heat-hardenable composition.

4. A heat-hardenable composition of matter, which comprises
    (1) a chlorovinyl polymer selected from the group consisting of homopolymers of vinyl chloride and copolymers of vinyl chloride with at least one other copolymerizable ethylenically unsaturated monomer;
    (2) a plasticizer for said chlorovinyl polymer in which the said polymer is insoluble at room temperature;
    (3) a 1,2-epoxide compound having a 1,2-epoxy equivalency greater than 1;
    (4) as cross-linking agent the condensation product of a polyamine of the formula $H_2N(C_2H_4NH)_nH$, where $n$ is an integer of at least 1 and at the most 4 with a ketone, which is volatile at the curing temperature of the heat-hardenable composition, said condensation product being free from primary amino groups;
    (5) a minor amount of water, said amount being sufficient to promote the liberation of the free amine from the condensation product of the polyamine with the ketone at the curing temperature of the heat-hardenable composition.

5. A heat-hardenable composition of matter, which comprises
    (1) a chlorovinyl polymer selected from the group consisting of homopolymers of vinyl chloride and copolymers of vinyl chloride with at least one other copolymerizable ethylenically unsaturated monomer;
    (2) a plasticizer for said chlorovinyl polymer in which the said polymer is insoluble at room temperature;
    (3) a 1,2-epoxide compound having a 1,2-epoxy equivalency greater than 1;
    (4) as cross-linking agent the condensation product of a polyamine selected from the group consisting of ethylene diamine and diethylene triamine with methyl isobutyl ketone, said condensation product being free from primary amino groups;
    (5) a minor amount of water, said amount being sufficient to promote the liberation of the free amine from the condensation product of the polyamine with the ketone at the curing temperature of the heat-hardenable composition.

6. A composition as claimed in claim 1, wherein the 1,2-epoxy compound is the diglycidyl ether which is obtained by reacting N-phenyldiethanolamine with epichlorohydrine in the presence of alkali.

References Cited by the Examiner

UNITED STATES PATENTS 2,872,427   2/1959   Schroeder _____ 260—29.6

FOREIGN PATENTS 1,010,677   8/1954   Germany.
777,052    11/1954   Great Britain.

SAMUEL H. BLECH, *Primary Examiner.*

MURRAY TILLMAN, *Examiner.*